United States Patent
Anand et al.

(10) Patent No.: US 9,203,763 B2
(45) Date of Patent: *Dec. 1, 2015

(54) PACKET TRAIN GENERATION FOR ESTIMATING AVAILABLE NETWORK BANDWIDTH

(71) Applicant: TELEFONAKTIEBOLAGET L M ERICSSON (PUBL), Stockholm (SE)

(72) Inventors: Prashant Anand, Bangalore (IN); Vinayak Joshi, Bangalore (IN); Ashish Anand, Bangalore (IN)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/549,440

(22) Filed: Nov. 20, 2014

(65) Prior Publication Data
US 2015/0078159 A1 Mar. 19, 2015

Related U.S. Application Data

(63) Continuation of application No. 13/719,877, filed on Dec. 19, 2012, now Pat. No. 8,923,122.

(51) Int. Cl.
*H04J 1/16* (2006.01)
*H04L 12/815* (2013.01)
(Continued)

(52) U.S. Cl.
CPC ............ *H04L 47/22* (2013.01); *H04L 43/0876* (2013.01); *H04L 47/50* (2013.01); *H04L 43/0811* (2013.01)

(58) Field of Classification Search
CPC ........ H04L 47/10; H04L 47/22; H04L 47/225
USPC .......................................... 370/229–252, 474
See application file for complete search history.

(56) References Cited

U.S. PATENT DOCUMENTS

2008/0002594 A1   1/2008  Forsberg et al.
2010/0329250 A1*  12/2010 Olesinski et al. ............. 370/389
(Continued)

FOREIGN PATENT DOCUMENTS

WO   WO 2009/118602 A2   10/2009

OTHER PUBLICATIONS

Mats Bjorkman, et al.; "Bandwidth Available in Real Time measurement Applications"; Ericsson AB, SICS AB; 2008; 6 pages.
(Continued)

*Primary Examiner* — Kan Yuen (57) ABSTRACT

Aspects of a high-precision packet train generation process are distributed among several distinct processing elements. In some embodiments a control processor configures a packet-processing unit with a packet train context that includes details such as the number of packets to be generated and the headers to be included in the packets. The packet-processing unit takes a packet to be used in the packet train and recirculates it a number of times, as specified by the packet train context. The recirculated packets, with the appropriate headers inserted, are forwarded to a traffic-shaping queue in queuing hardware. The traffic-shaping queue is configured to output the forwarded packets with a constant inter-packet gap. Thus, the generation of the multiple packets in the packet train is handled by the packet-processing unit, while the precise inter-packet timing is provided by the traffic-shaping queue in the queuing hardware.

8 Claims, 5 Drawing Sheets

(51) Int. Cl.
*H04L 12/26* (2006.01)
*H04L 12/863* (2013.01)

(56) References Cited

U.S. PATENT DOCUMENTS

| | | | |
|---|---|---|---|
| 2011/0222431 | A1 | 9/2011 | Oue |
| 2012/0014396 | A1 | 1/2012 | Bae |
| 2012/0128000 | A1 | 5/2012 | Baillargeon |
| 2013/0230060 | A1 | 9/2013 | Bernhard et al. |
| 2014/0169166 | A1 | 6/2014 | Anand et al. |
| 2014/0310390 | A1* | 10/2014 | Sorenson et al. ............ 709/223 |

OTHER PUBLICATIONS

K. Hedayat, et al.; "A Two-Way Active Measurement Protocol (TWAMP)"; Network Working Group; RFC 5357; Oct. 2008; 26 pages.
A. Morton, et al.; "Two-Way Active Measurement Protocol (TWAMP) Reflect Octets and Symmetrical Size Features"; Internet Engineering Task Force (IETF); RFC 6038; Oct. 2010; 18 pages.
N. McKeown, "Software-defined Networking", Infocom, Apr. 2009, 64 Pages.
D. Katz and D. Ward, "Bidirectional Forwarding Detection (BFD)", Internet Engineering Task Force, Request for Comments: 5880, Jun. 2010, 49 pages.
D. Katz and D. Ward, "Bidirectional Forwarding Detection (BFD) for IPv4 and IPv6 (Single Hop)", Internet Engineering Task Force, Request for Comments: 5881, Jun. 2010, 7 pages.
D. Katz and D. Ward, "Generic Application of Bidirectional Forwarding Detection (BFD)", Internet Engineering Task Force, Request for Comments: 5882, Jun. 2010, 17 pages.
D. Katz and D. Ward, "Bidirectional Forwarding Detection (BFD) for Multihop Paths", Internet Engineering Task Force, Request for Comments: 5883, Jun. 2010, 6 pages.
"Ethernet ring protection switching", Series G: Transmission Systems and Media, Digital Systems and Networks, International Telecommunication Union, ITU-T, G.8032/Y.1344, Feb. 2012, 104 pages.
"OpenFlow Switch Specification Version 1.3.5 (Protocol version 0x04)", Open Networking Foundation, Mar. 26, 2015, pp. 177 pages.
P. Anand et al., "High-Precision Packet Train Generation", U.S. Appl. No. 14/628,121, filed on Feb. 20, 2015, 50 pages.
S. Narikawa, "G.8032: Ethernet Ring protection characteristics, architectures and the Ring APS protocol", Joint ITU-T/IEEE Workshop on the Future of Ethernet Transport, IEEE, May 28, 2010, 23 pages.
J. Postel, "User Datagram Protocol", RFC: 768, Aug. 28, 1980, 3 pages.
"Transmission Control Protocol, DARPA Internet Program Protocol Specification", Sep. 1981, RFC: 793, Information Sciences Institute, University of Southern California, Marina del Rey, California, 91 pages.
T. Socolofsky and C. Kale., "A TCP/IP Tutorial", Network Working Group, Request for Comments: 1180, Jan. 1991, 28 pages.
S. Deering and R. Hinden, "Internet Protocol, Version 6 (IPv6) Specification", Network Working Group, Request for Comments: 2460, Dec. 1998, 39 pages.
K. Nichols, et al., "Definition of the Differentiated Services Field (DS Field) in the IPv4 and IPv6 Headers", Network Working Group, Request for Comments: 2474, Dec. 1998, 20 pages.
S. Blake, et al., "An Architecture for Differentiated Services", Network Working Group, Request for Comments: 2475, Dec. 1998, 36 pages.
J. Heinanen, et al., "Assured Forwarding PHB Group", Network Working Group, Request for Comments: 2597, Jun. 1999, 11 pages.
D. Borman, et al., "IPv6 Jumbograms", Network Working Group, Request for Comments: 2675, Aug. 1999, 9 pages.
D. Black, "Differentiated Services and Tunnels", Network Working Group, Request for Comments: 2983, Oct. 2000, 14 pages.
K. Nichols and B. Carpenter, "Definition of Differentiated Services Per Domain Behaviors and Rules for their Specification", Network Working Group, Request for Comments: 3086, Apr. 2001, 24 pages.
D. Black, et al., "Per Hop Behavior Identification Codes", Network Working Group, Request for Comments: 3140, Jun. 2001, 8 pages.
B. Davie, et al., "An Expedited Forwarding PHB (Per-Hop Behavior)", Network Working Group, Request for Comments: 3246, Mar. 2002, 16 pages.
A. Charny, et al., "Supplemental Information for the New Definition of the EF PHB (Expedited Forwarding Per-Hop Behavior)", Network Working Group, Request for Comments: 3247, Mar. 2002, 24 pages.
D. Grossman, "New Terminology and Clarifications for Diffserv", Network Working Group, Request for Comments: 3260, Apr. 2002, 10 pages.
F. Baker, et al., "Management Information Base for the Differentiated Services Architecture", Network Working Group, Request for Comments: 3289, May 2002, 116 pages.
Y. Bernet, et al., "An Informal Management Model for Diffsery Routers", Network Working Group, Request for Comments: 3290, May 2002, 56 pages.
K. Chan, et al., "Differentiated Services Quality of Service Policy Information Base," Network Working Group, Request for Comments: 3317, Mar. 2003, 96 pages.
B. Fenner and J. Flick, "Management Information Base for the User Datagram Protocol (UDP)", Network Working Group, Request for Comments: 4113, Jun. 2005, 19 pages.
S. Kent and K. Seo., "Security Architecture for the Internet Protocol", Network Working Group, Request for Comments: 4301, Dec. 2005, 101 pages.
R. Housley, "Using Advanced Encryption Standard (AES) CCM Mode with IPsec Encapsulating Security Payload (ESP)", Network Working Group, Request for Comments: 4309, Dec. 2005, 13 pages.
E. Rosen and Y. Rekhter, "BGP/MPLS IP Virtual Private Networks (VPNs)", Network Working Group, Request for Comments: 4364, Feb. 2006, 47 pages.
J. Babiarz, et al., "Configuration Guidelines for DiffSery Service Classes," Network Working Group, Request for Comments: 4594, Aug. 2006, 57 pages.
K. Kompella and Y. Rekhter, "Virtual Private Lan Service (VPLS) Using BGP for Auto-Discovery and Signaling", Network Working Group, Request for Comments: 4761, Jan. 2007, 28 pages.
M. Lasserre and K. Kompella, "Virtual Private LAN Service (VPLS) Using Label Distribution Protocol (LDP) Signaling", Network Working Group, Request for Comments: 4762, Jan. 2007, 31 pages.
L. Eggert and G. Fairhurst, "Unicast UDP Usage Guidelines for Application Designers", Network Working Group, Request for Comments: 5405, Nov. 2008, 27 pages.
F. Baker, et al., "A Differentiated Services Code Point (DSCP) for Capacity-Admitted Traffic", Internet Engineering Task Force (IETF), Request for Comments: 5865, May 2010, 14 pages.

* cited by examiner

PACKET TRAIN GENERATION FOR ESTIMATING AVAILABLE NETWORK BANDWIDTH

CROSS-REFERENCE TO RELATED APPLICATIONS

This application is a continuation of, and claims the benefit of, U.S. patent application Ser. No. 13/719,877, filed Dec. 19, 2012, which is hereby incorporated by reference in its entirety for all purposes.

TECHNICAL FIELD

The present invention is generally related to packet processing in high-speed communications network equipment, and is more particularly related to the generation of high-precision packet trains in such equipment.

BACKGROUND

In fourth-generation (4G) IP networks, as in any high-performance data network, measuring and monitoring parameters like latency, available bandwidth, jitter, etc., are of immense important, since that which is not measured cannot be reliably controlled. In response to this need, several Requests for Comment (RFCs) related to network monitoring and measurement have recently emerged in the Internet Engineering Task Force (IETF), the largest international organization concerned with the evolution of the Internet. Examples include RFC 5357, titled "A Two-Way Active Measurement Protocol (TWAMP), and RFC 6038, titled "Two-Way Active Measurement Protocol (TWAMP) Reflect Octets and Symmetrical Size Features."

For some measurements of network performance, there is a requirement of generating a precise packet train, to be used as a traffic pattern for non-intrusive IP network measurement. In particular, some advanced techniques for estimating the available bandwidth in an IP network path require the high-speed generation of a short packet train with precise inter-packet gaps, so that congestion can be generated on a very short time scale. Based on time stamping done at a packet train sender and a receiver, packet dispersion can be evaluated to determine exactly how the packet train is affected as it traverses the network. This packet dispersion can be evaluated in turn to determine the available bandwidth.

The generation of short packet trains with precise inter-packet gaps presents a number of challenges in practice, however. Several of these challenges arise from the architecture of the typical packet processing platform, which may include a control processor, running a non-real-time operating system, a packet/network processor circuit, specially designed to handle network designed, and line interface cards, which provide hardware-based, high-speed functions such as fabric queuing, traffic shaping, and the like.

One challenge is that increasing port bandwidths necessitate even higher-performance packet generation and transmission techniques. This high performance is not likely to be available from a general-purpose control processing element or from the Operations, Administration and Maintenance (OAM) engine on a packet processor chip, for example, as these devices cannot provide the precise timing needed. If precise inter-packet gaps are not produced, the performance of bandwidth estimation algorithms will be adversely affected. Likewise, additional latency introduced by such devices will delay the measurement feedback, possibly leading to oscillations in control loops and/or to sub-optimal performance in one or more network zones. These problems will continue to get worse with higher throughput interfaces.

Of course, specialized circuits could be developed for generating high-speed, high-precision packet trains. However, such circuits are likely to be costly, and this approach does not address the problem for existing platforms. Accordingly, techniques are needed for generating high-speed, high-precision packet trains in packet processing platforms having conventional architectures.

SUMMARY

Because of the low resolution of the operating system clock, a CPU-based technique is not suitable for producing a high-precision packet train. Similar problems arise when attempting to generate a packet train with an Operations, Administration, and Maintenance (OAM) processor. The situation becomes even more challenging as the network path bandwidths increase.

In several embodiments of the present invention, these problems are addressed by distributing aspects of the packet train generation process among several distinct processing elements. For example, in some embodiments a control processor configures a packet-processing unit with a packet train context that includes details such as the number of packets to be generated and the headers to be included in the packets. The packet-processing unit takes a packet to be used in the packet train and recirculates it a number of times, as specified by the packet train context. The recirculated packets, with the appropriate headers inserted, are forwarded to a traffic-shaping queue in queuing hardware. The traffic-shaping queue is configured to output the forwarded packets with a constant inter-packet gap. Thus, the generation of the multiple packets in the packet train is handled by the packet-processing unit, while the precise inter-packet timing is provided by the traffic-shaping queue in the queuing hardware.

Example embodiments of the present invention include a method for generating a high-precision packet train, suitable for implementation in a packet processing platform that includes a packet-processing unit and queuing hardware, where said queuing hardware is configured to output data at a network bitrate. The method begins with the receiving of a packet train context at the packet-processing unit. The packet train context indicates a number of packets to be generated for the packet train and includes a packet header designating a traffic-shaping queue in the queuing hardware. The packet-processing unit also receives a packet for use in generating the packet train, the packet including information identifying the packet train context. The queuing hardware receives configuration information that establishes a constant inter-packet gap for packets output by the traffic-shaping queue designated by the packet header.

Next, the packet-processing unit injects the packet with the packet header from the packet train context and forwards the packet, including the packet header, to the queuing hardware for handling by the traffic-shaping queue designated by the packet header. The packet-processing unit recirculates the packet in the packet-processing unit and forwards recirculated packets to the queuing hardware until the number of forwarded packets equals the number of packets indicated by the packet train context. This forwarding is performed at a rate sufficient to keep the traffic-shaping queue at least fully subscribed, given the constant inter-packet gap for packets output by the traffic-shaping queue. The forwarded packets are output from the traffic-shaping queue, at the network bitrate, such that the output packets are separated by the constant inter-packet gap.

In some embodiments of this method, the packet train context, configuration information, and packet are received from a control processing unit in the packet processing platform. In some implementations, the configuration information provided to the queuing hardware establishes the constant inter-packet gap by specifying a credit gain rate for leaky bucket credit-based shaping by the traffic-shaping queue.

Other embodiments of the invention include packet processing platforms configured to carry out the method summarized above and/or variants thereof. For example, a packet processing platform according to several embodiments of the invention includes queuing hardware configured to output data to a data network at a network bitrate and further configured to receive configuration information establishing a constant inter-packet gap for packets output by a traffic-shaping queue in the queuing hardware. The packet processing platform further includes a packet-processing unit, which is configured to receive a packet train context, the packet train context indicating a number of packets to be generated for the packet train and including a packet header designating the traffic-shaping queue in the queuing hardware. The packet-processing unit is further configured to receive a packet, the packet including information identifying the packet train context, to inject the packet with the packet header, and to forward the packet, including the packet header, to the queuing hardware for handling by the traffic-shaping queue designated by the packet header. The packet-processing unit is still further configured to recirculate the packet in the packet-processing unit and forward recirculated packets to the queuing hardware until the number of forwarded packets equals the number of packets indicated by the packet train context. This forwarding is performed at a rate sufficient to keep the traffic-shaping queue at least fully subscribed, given the constant inter-packet gap for packets output by the traffic-shaping queue;

The queuing hardware in this example packet processing platform is further configured to output the forwarded packets from the traffic-shaping queue to the data network, at the network bitrate, such that the output packets are separated by the constant inter-packet gap. In some cases, the queuing hardware further includes a virtual output queue interposed between the traffic-shaping queue and a switch fabric, in which case the queuing hardware is configured to output the forwarded packets from the traffic-shaping queue via the virtual output queue.

In some embodiments of the packet processing platform described above, the traffic-shaping queue is configured to implement leaky bucket credit-based traffic shaping. In this case, the configuration information received by the queuing hardware establishes the constant inter-packet gap by specifying a credit gain rate for the leaky bucket credit-based shaping.

In some embodiments, the packet processing platform further includes a control processing unit configured to provide said configuration information to the queuing hardware and to provide said packet train context and said packet to the packet-processing unit. In embodiments where the queuing hardware provides leaky bucket credit-based traffic shaping, for example, the control processing unit may be configured to determine a credit gain rate for leaky bucket credit-based shaping by the traffic-shaping queue, based on a desired inter-packet gap, and to include the credit gain rate in the configuration information provided to the queuing hardware.

This disclosure thus describes a generic method to solve the problem of precise packet train generation on a packet processing platform, which method can be implemented on many packet processing platforms. Example embodiments of the methods and apparatus summarized above are described in detail below. Of course, the present invention is not limited to the above-summarized features and advantages. Indeed, those skilled in the art will recognize additional features and advantages upon reading the following detailed description, and upon viewing the accompanying drawings.

DETAILED DESCRIPTION

In the discussion that follows, specific details of particular embodiments of the present invention are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not to obscure the description with unnecessary detail. Those skilled in the art will appreciate that the functions described may be implemented in one or in several nodes. Some or all of the functions described may be implemented using hardware circuitry, such as analog and/or discrete logic gates interconnected to perform a specialized function, ASICs, PLAs, etc. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

As suggested above, a general-purpose CPU is not able to generate the high-performance packet trains needed to support advanced network measurement and monitoring techniques. When a packet is generated from a CPU, data transfer works across two different clock domains—an operating system clock domain and a network clock domain. The operating system clock, which is basically the timer interrupt, might be on the order of 10 milliseconds, for example. It works as heartbeat for the operating system, but is not suitable for high-precision timing tasks. Increasing the speed, i.e., granularity, of the operating system clock would improve the resolution of the timer interrupts, but the processor would then spend much more of its time in kernel mode, executing the operating system code. This would bring down the user-level computation utilization for the processor.

On the other hand, the network clock in this context is packet-size mapped to the time domain, for a certain link speed. An example high-speed link might operate at 10 Gigabits-per-second (10 G), for example. Assume that smaller size packets on a 10 G link consume 84 bytes, e.g., a 64-byte payload, plus a 12-byte inter-frame gap (IFG), plus an 8-byte preamble. These 84 bytes take 67.2 nanosecond (nsec) to transmit on a 10 G link, at 0.1 nsec/bit. Thus, the network clock in this context must accommodate network processing at intervals on the order of 67.2 nsec, which is orders of magnitude smaller than the typical operating system clock period.

Because of the low resolution of the operating system clock, a CPU-based technique is not suitable for producing a high-precision packet train. With the CPU-based approach, a packet train generation application will load the transfer buffer, after which the entire buffer is emptied out on the wire at once to create the burst. Because the time period of OS clock is much higher than the network clock, as discussed above, it is quite obvious that we shall a poorly controlled burst of packets for a given connection.

Similar problems arise when attempting to generate a packet train with an OAM processor. The situation becomes even more challenging as the network path bandwidths increase. Further, the OAM processor is also tasked with other important task like operating a high-resolution Bidirectional Forwarding Detection (BFD) session or carrying out 3.3 msec 802.1ag Connectivity Fault Management/Continuity Check Message (CFM/CCM) operations.

Figure 1:
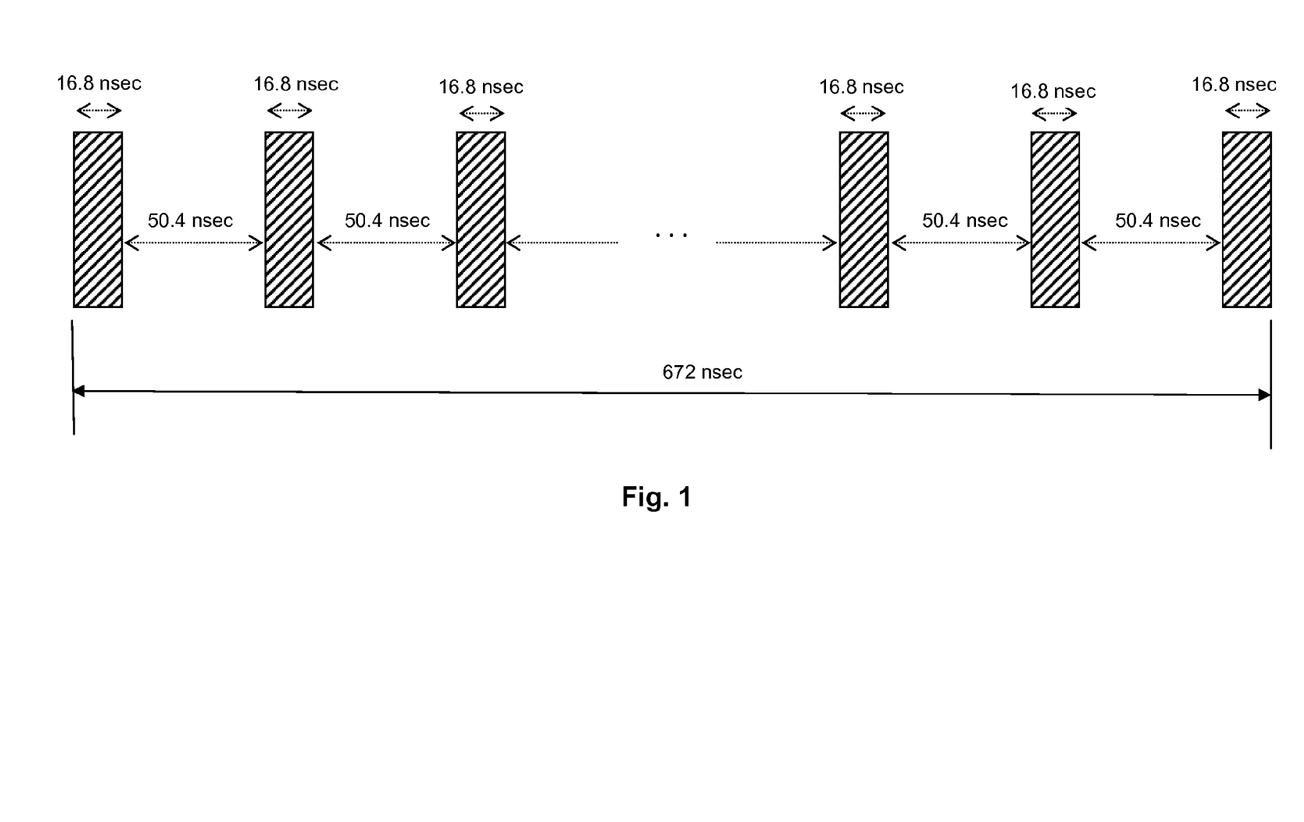
FIG. 1 illustrates a high-precision packet train suitable for network monitoring in a high-speed packet communications network.

Thus, CPU-based or OAM processor-based techniques are not able to meet the strict requirements for generating a packet train with precise inter-packet gap for high-speed network monitoring. For example, the scenario introduced earlier requires the generation of short-term congestion at 10 G on a 40 G Ethernet port for 672 nsec. The packet train characteristics for this scenario can be derived will be as follows:
  Assume the packet is 64 bytes in length;
  Add a preamble and Start Frame Delimiter (SFD) of 8 bytes and inter-frame gap (IFG) of 12 bytes;
  Total bytes on wire=8 (preamble & SFD)+64 (actual packet)+12 (IFG)=84 bytes;
  84 bytes*8 bits/byte=672 bits;
  At 40 G, each bit is 0.025 nsec; hence, duration of transmission unit on wire in time domain is 672 bits*0.025 nsec=16.8 nsec;
  To create short-term congestion for 672 nsec, 10 packets (672 nsec/4*16.8 nsec/packet=10) with a precise period of 67.2 nsec. Given a packet time of 16.8 nsec, this yields an inter-packet gap of 50.4 nsec.

This example packet train is illustrated in FIG. 1.

In several embodiments of the present invention, the problems discussed above are addressed by distributing aspects of the packet train generation process among several distinct processing elements. A control processor (which may be onboard a packet processing platform or offboard) configures a packet-processing unit with a packet train context that includes details such as the number of packets to be generated and the headers to be included in the packets. This packet-processing unit may be a specialized packet-processing engine, such as the high-performance network processor units (NPUs) developed by such companies as EZchip.

The packet-processing unit takes a packet to be used in the packet train and recirculates it a number of times, as specified by the packet train context. The recirculated packets, with the appropriate headers inserted, are forwarded to a traffic-shaping queue in queuing hardware. The traffic-shaping queue is configured (e.g., by the same control processor that established the packet train context) to output the forwarded packets with a constant inter-packet gap. Thus, the generation of the multiple packets in the packet train is handled by the packet-processing unit, while the precise inter-packet timing is provided by the traffic-shaping queue in the queuing hardware. All of this may be performed under the control of a control processor, which may reside on the packet processing platform or elsewhere.

Figure 2:
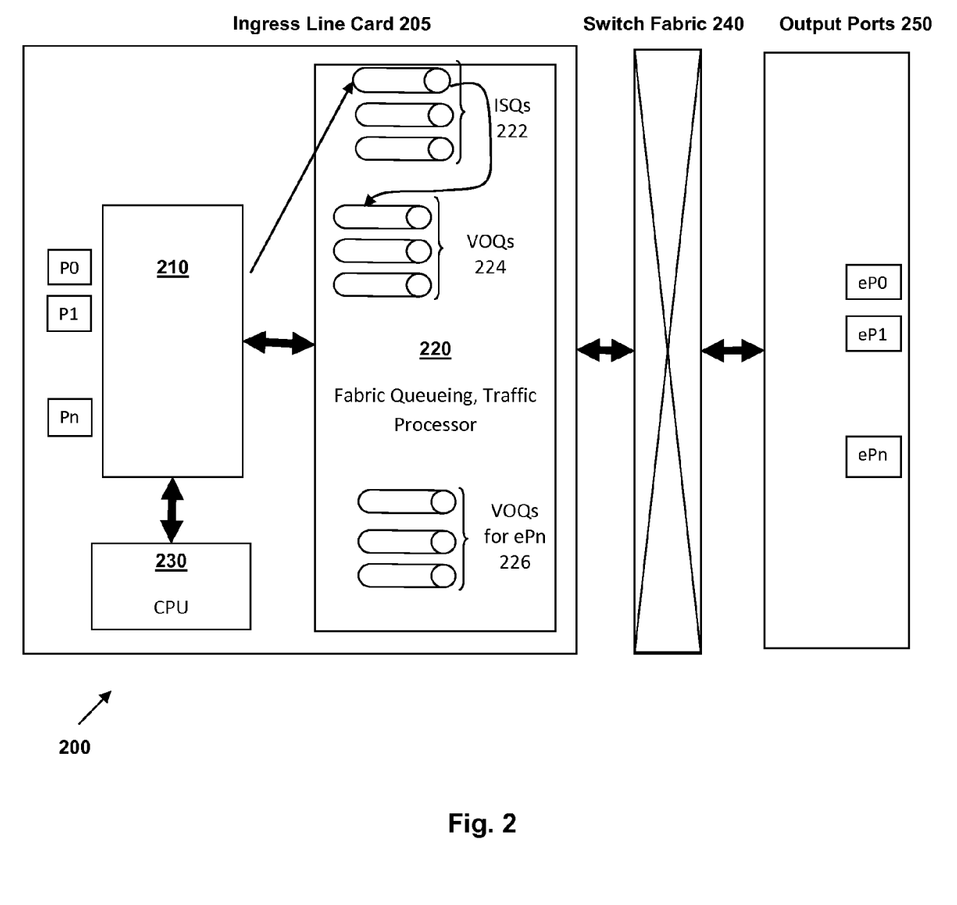
FIG. 2 is a block diagram illustrating components of an example packet processing platform according to some embodiments of the present invention.

FIG. 2 is a schematic diagram illustrating a portion of an example packet-processing platform configured to generate high-precision packet trains according to some embodiments of the present invention. The illustrated components include an ingress line card 205, a switch fabric 240, and output ports 250. While several aspects of the invention are described below in the context of an ingress line card like the illustrated card, it will be appreciated that the same or similar techniques may also be implemented in an egress line card.

Ingress line card 205 includes a fabric queuing and traffic processor, which further includes queuing hardware 220, including ingress shaping queues (ISQs) 222 and virtual output queues (VOQs) 224 and 226. ISQs 222 are traffic-shaping queues configured to output data to a data network (via switch fabric 240 and output ports 250) at a network bitrate. The ISQs 222 are further configured to receive configuration information that establishes a constant inter-packet gap for packets output by the ISQs. This configuration information may be received from a control processor, for example, such as CPU 230. In some cases, as shown in FIG. 2, a VOQ 224 may be interposed between a traffic-shaping queue and the switch fabric 240; in this case packets output by the traffic-shaping queue to the data network are sent via the VOQ 224.

Ingress line card further includes a packet-processing unit 210, which is configured to receive a packet train context from a control unit, such as CPU 230. The packet train context indicates a number of packets to be generated for the packet train and includes a packet header designating a particular traffic-shaping queue (e.g., one of ISQs 222) in the queuing hardware 220. The packet-processing unit 210 is further configured to receive a packet for use in generating a packet train, the packet including information identifying the packet train context. The packet-processing unit 210 injects the packet with the packet header from the packet train context and forwards the packet, including the packet header, to the queuing hardware 220 for handling by the traffic-shaping queue designated by the packet header. The packet-processing unit 210 recirculates the packet and forwards recirculated packets to the queuing hardware 220 until the number of forwarded packets equals the number of packets indicated by the packet train context. While this forwarding need not be performed with a precise inter-packet gap, it should be performed at a rate sufficient to keep the traffic-shaping queue at least fully subscribed, given the constant inter-packet gap for packets output by the traffic-shaping queue.

The queuing hardware 220, on the other hand, is configured to output the forwarded packets from the traffic-shaping queue to the data network, at the network bitrate, such that the output packets are separated by the constant inter-packet gap. This is primarily accomplished by the traffic-shaping queue specified by the packet train context, in this case one of the ISQs 222. While other types of traffic-shaping queues are possible, one particularly suitable configuration for each of the ISQs 222 is a leaky bucket credit-based traffic-shaping queue. In this case, the configuration information supplied to the designated ISQ 222 specifies a credit gain rate to be applied by the ISQ 222 in performing its credit-based shaping; this credit gain rate is calculated to produce the proper inter-packet gap, given the packet size, the network link speed, and the desired density for the packet train. In the example scenario illustrated in FIG. 1, for example, the traffic-shaping queue should be configured with a credit gain of 84 bytes (for 64 byte packet) every 67.2 nsec.

Each of the several processing elements in the example illustrated in FIG. 2 is responsible for several operations. First, CPU 230 creates a packet train context in the memory of packet-processing unit 210. This context is created in the data plane, and indicates a number of packets to be generated, which in turn indicates how many times a packet re-circulation will happen in the packet-processing unit 210. The CPU 230 also configures an ISQ 222 with the right parameters. This configuration will establish a precise constant gap between the packets. Because this is like a constant-bitrate (CBR) flow, the burst configuration will not be more than one packet size. Also ISQ credit gain rate is configured as per the rate required. The CPU also configures the required ISQ header for the packet train context—this ISQ header specifies the proper ISQ 222 in queuing hardware 220. Finally, the CPU 230 injects the packet with information about the context record to be used for this packet, and provides it to packet-processing unit 210. After this, CPU 210 is not further involved in the packet train generation.

As noted above, the packet-processing unit 210 recirculates the packet a number of times specified by the packet train context, and forwards the recirculated packets to the queuing hardware 220. Each time one of these packets is forwarded to the queuing hardware 220, a time stamp is generated and embedded in the packet for later use in evaluating latency and packet dispersion. Note, however that this time stamp can be embedded in the packet at other times or places, such as in the egress pipe or while transferring the packet from ISQ 222 to a VoQ 224.

The packet-processing unit 210 imposes each packet with two headers. A first header is an ISQ header fetched from the packet train context created by the CPU 230 in the data plane. A second header is a normal VoQ header, i.e. fabric header. Each recirculation packet may be injected with a copy count as well. This copy count of the packet can be compared with the total number of packets needed to be generated in the packet train; this can be used for termination of packet recirculation.

Packets forwarded by packet-processing unit 210 are then handled by queuing hardware 220. The packets are first queued to the proper ISQ 222, based on the ISQ header imposed on the packet by packet-processing unit 210. The ISQ 22 then leaks out the forward packets according to the traffic-shaping configuration information provided by CPU 210. Once each packet is leaked out of ISQ 222, it is queued to a VoQ 224, based on the normal VoQ header in the packet. Note that it is assumed that the packet-processing unit is able to generate packets quickly enough to match up with the ISQ configuration, so that the ISQ 222 will not under-run. Also note that the ISQ 222 may be configured with dedicated buffers.

Figure 3:
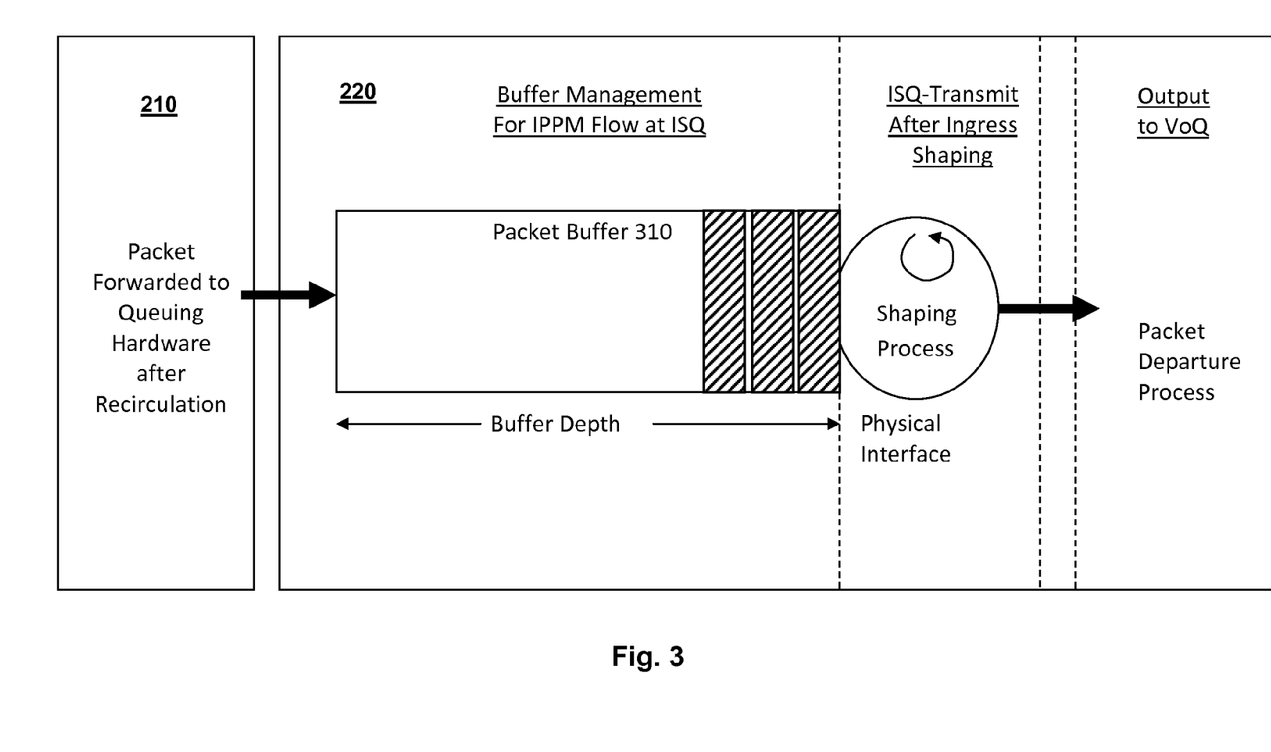
FIG. 3 illustrates an example of detailed queuing operations in queuing hardware.

FIG. 3 illustrates an example of the packet flow from the packet-processing unit 210 through the queuing hardware 220. As shown at the left-hand side, the packets are forwarded by the packet-processing unit 210 to the queuing hardware 220, which directs the packet to a packet buffer 310 for the traffic-shaping queue designated by the packet header, in this case an ISQ 222. Next, the packets proceed through a shaping process in the ISQ 222, after which the packets are transmitted to a VoQ 224, which handles the departure process from the queuing hardware to the switch fabric 240.

Figure 4:
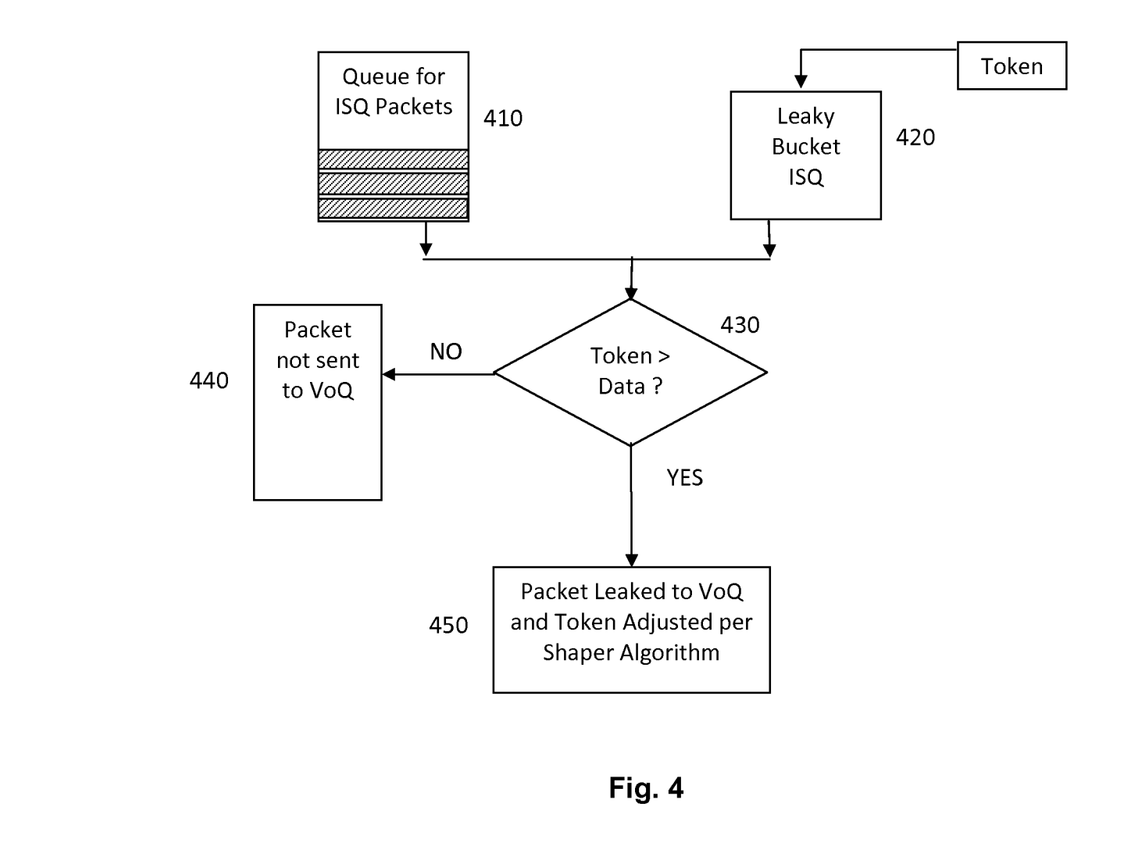
FIG. 4 illustrates features of a leaky bucket credit-based traffic shaping process.

FIG. 4 is a simplified illustration of a leaky bucket credit-based shaping process, such as might be implemented in ISQs 222. FIG. 4 shows a single iteration of a repetitive process; it will be appreciated that the illustrated process is repeated over and over again.

As shown at block 410, an ISQ buffer receives packets for queuing and traffic shaping. A leaky bucket process, shown at block 420, receives "tokens," or "credit," at a rate specified by the ISQ configuration. As shown at block 430, the ISQ periodically evaluates the accumulated tokens/credit to determine whether there is sufficient credit to permit "leaking" of a packet. If not, as indicated at block 440, no packet is leaked at this iteration. If there is sufficient credit, on the other hand, a packet is leaked to the VOQ. The token/credit balance is adjusted to reflect the leaked packet, according to the shaping algorithm.

Figure 5:
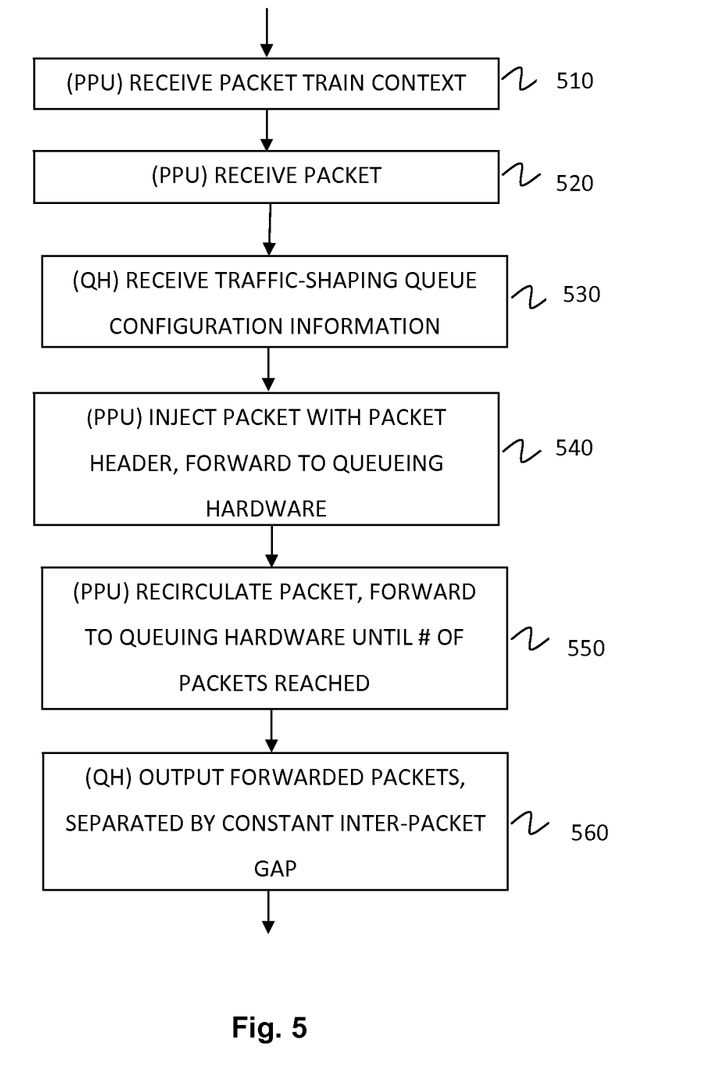
FIG. 5 is a process flow diagram illustrating an example method for packet train generation according to some embodiments of the present invention.

With the preceding detailed examples in mind, it should be appreciated that the process flow diagram of FIG. 5 illustrates a generalized method for generating a high-precision packet train according to several embodiments of the present invention. The illustrated method is suitable for implementation in a packet processing platform that includes a packet-processing unit and queuing hardware, where said queuing hardware is configured to output data at a network bitrate. The process flow diagram in FIG. 5 indicates which element is carrying out each illustrated operation with a "PPU," for "packet-processing unit," or a "QH," for "queuing hardware."

As shown at block 510, the method begins with the receiving of a packet train context at the packet-processing unit. The packet train context indicates a number of packets to be generated for the packet train and includes a packet header designating a traffic-shaping queue in the queuing hardware. The packet-processing unit also receives a packet for use in generating the packet train, as shown at block 520, the packet including information identifying the packet train context. As shown at block 530, the queuing hardware receives configuration information that establishes a constant inter-packet gap for packets output by the traffic-shaping queue designated by the packet header.

Next, as shown at block 540, the packet-processing unit injects the packet with the packet header from the packet train context and forwards the packet, including the packet header, to the queuing hardware for handling by the traffic-shaping queue designated by the packet header. As illustrated at block 550, the packet-processing unit recirculates the packet in the packet-processing unit and forwards recirculated packets to the queuing hardware until the number of forwarded packets equals the number of packets indicated by the packet train context. This forwarding is performed at a rate sufficient to keep the traffic-shaping queue at least fully subscribed, given the constant inter-packet gap for packets output by the traffic-shaping queue. As shown at block 560, these forwarded packets are output from the traffic-shaping queue, at the network bitrate, such that the output packets are separated by the constant inter-packet gap.

In some embodiments of the method illustrated in FIG. 5, the packet train context, configuration information, and packet are received from a control processing unit in the packet processing platform. In some implementations, the configuration information provided to the queuing hardware establishes the constant inter-packet gap by specifying a credit gain rate for leaky bucket credit-based shaping by the traffic-shaping queue.

Likewise, in some embodiments the outputting of the forwarded packets is via a virtual output queue interposed between the traffic-shaping queue and a switch fabric. It will be appreciated, however, that the technique illustrated in FIG. 5 may be implemented in an egress line card, in some embodiments, in which case the packets are outputted by the queuing hardware to an output port of the packet processing platform.

Other embodiments of the invention include packet processing platforms configured to carry out the method illustrated in FIG. 5 and/or variants thereof. Details of one such platform were illustrated in FIGS. 2-4 and described above. More generally, however, a packet processing platform according to several embodiments of the invention includes queuing hardware configured to output data to a data network at a network bitrate and further configured to receive configuration information establishing a constant inter-packet gap for packets output by a traffic-shaping queue in the queuing hardware. In some embodiments, the queuing hardware may correspond to the queuing hardware 220 illustrated in FIG. 2.

The packet processing platform further includes a packet-processing unit, which may correspond to the packet-processing unit 210 illustrated in FIG. 2. The packet-processing unit is configured to receive a packet train context, the packet train context indicating a number of packets to be generated for the packet train and including a packet header designating the traffic-shaping queue in the queuing hardware. The packet-processing unit is further configured to receive a packet, the packet including information identifying the packet train context, to inject the packet with the packet header, and to forward the packet, including the packet header, to the queuing hardware for handling by the traffic-shaping queue designated by the packet header. The packet-processing unit is still further configured to recirculate the packet in the packet-processing unit and forward recirculated packets to the queuing hardware until the number of forwarded packets equals the number of packets indicated by the packet train context. This forwarding is performed at a rate sufficient to keep the traffic-shaping queue at least fully subscribed, given the constant inter-packet gap for packets output by the traffic-shaping queue;

The queuing hardware is further configured to output the forwarded packets from the traffic-shaping queue to the data network, at the network bitrate, such that the output packets are separated by the constant inter-packet gap. In some cases, the queuing hardware further includes a virtual output queue interposed between the traffic-shaping queue and a switch fabric, in which case the queuing hardware is configured to output the forwarded packets from the traffic-shaping queue via the virtual output queue.

In some embodiments of the packet processing platform described above, the traffic-shaping queue is configured to implement leaky bucket credit-based traffic shaping. In this case, the configuration information received by the queuing hardware establishes the constant inter-packet gap by specifying a credit gain rate for the leaky bucket credit-based shaping.

In some embodiments, the packet processing platform further includes a control processing unit configured to provide said configuration information to the queuing hardware and to provide said packet train context and said packet to the packet-processing unit. This control processing unit may correspond to the CPU 230 illustrated in FIG. 2, in some embodiments. In embodiments where the queuing hardware provides leaky bucket credit-based traffic shaping, for example, the control processing unit may be configured to determine a credit gain rate for leaky bucket credit-based shaping by the traffic-shaping queue, based on a desired inter-packet gap, and to include the credit gain rate in the configuration information provided to the queuing hardware.

As will be readily understood by those familiar with network device design, several of the various functional blocks of the packet processing platforms described herein, including the packet-processing unit 210, queuing hardware 220, and CPU 230 illustrated in FIG. 2, may be implemented using digital logic and/or one or more microcontrollers, microprocessors, or other digital hardware. Further, several of the functional elements of the packet processing platform, such as the queuing hardware and parts of the packet-processing unit, may be provided through the use of dedicated hardware. Other elements, such as the control processor described above, may comprise hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of network devices will appreciate the cost, performance, and maintenance tradeoffs inherent in these design choices.

With these and other variations and extensions of the present invention in mind, it should be appreciated that the foregoing description and the accompanying drawings represent non-limiting examples of the methods and apparatus taught herein for generating a high-precision packet train in a packet processing platform. As such, the inventive apparatus and techniques taught herein are not limited by the foregoing description and accompanying drawings. Instead, the present invention is limited only by the following claims and their legal equivalents.

What is claimed is:

1. A method for generating a high-precision packet train in a packet processing platform, the method comprising:
    configuring a traffic-shaping queue to establish a constant inter-packet gap for packets output by the traffic-shaping queue at a network bit rate;
    forwarding a packet, including a packet header, to the traffic-shaping queue, the packet header including information identifying a packet train context;
    repeatedly forwarding copies of the packet to the traffic-shaping queue until the number of forwarded packets equals a number of packets associated with the packet train context, wherein said forwarding is performed at a rate sufficient to keep the traffic-shaping queue continuously subscribed, given the constant inter-packet gap for packets output by the traffic-shaping queue; and outputting the forwarded packets from the traffic-shaping queue, at the network bitrate, such that the output packets are separated by the constant inter-packet gap.

2. The method of claim 1, wherein said outputting of the forwarded packets is via a virtual output queue interposed between the traffic-shaping queue and a switch fabric.

3. The method of claim 1, wherein configuring the traffic-shaping queue comprises establishing the constant inter-packet gap by specifying a credit gain rate for leaky bucket credit-based shaping by the traffic-shaping queue.

4. A packet processing platform, comprising:
a traffic-shaping queue; and
a packet-processing unit configured to forward a packet, including a packet header, to the traffic-shaping queue, the packet header including information identifying a packet train context; and to repeatedly forward copies of the packet to the traffic-shaping queue until the number of forwarded packets equals a number of packets associated with the packet train context, wherein said forwarding is performed at a rate sufficient to keep the traffic-shaping queue continuously subscribed, given a constant inter-packet gap for packets output by the traffic-shaping queue, wherein said traffic-shaping queue is configured to output the forwarded packets at a network bitrate, such that the output packets are separated by the constant inter-packet gap.

5. The packet processing platform of claim 4, further comprising a virtual output queue interposed between the traffic-shaping queue and a switch fabric, such that packets output from the traffic-shaping queue to the switch fabric traverse the virtual output queue.

6. The packet processing platform of claim 4, wherein the traffic-shaping queue is configured to establish the constant inter-packet gap by using a specified credit gain rate for leaky bucket credit-based shaping.

7. The packet processing platform of claim 4, further comprising a control processing unit configured to configure the traffic-shaping queue to establish the constant inter-packet gap and to provide the packet to the packet-processing unit.

8. The packet processing platform of claim 7, wherein the control processing unit is configured to determine a credit gain rate for leaky bucket credit-based shaping by the traffic-shaping queue, based on a desired inter-packet gap, and to include the credit gain rate in configuration information to be provided to the traffic-shaping queue.

* * * * *